(12) United States Patent
Teo (10) Patent No.: US 11,056,137 B1
(45) Date of Patent: Jul. 6, 2021

(54) LOAD BEAM SIDE RAIL SHOCK CONTACT FEATURE

(71) Applicant: Western Digital Technologies, Inc., San Jose, CA (US)

(72) Inventor: Kia Moh Teo, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/861,207

(22) Filed: Apr. 28, 2020

(51) Int. Cl.
*G11B 5/48* (2006.01)
*G11B 25/04* (2006.01)

(52) U.S. Cl.
CPC .......... *G11B 5/4826* (2013.01); *G11B 5/4813* (2013.01); *G11B 5/4833* (2013.01); *G11B 5/4866* (2013.01); *G11B 25/043* (2013.01)

(58) Field of Classification Search
None
See application file for complete search history.

(56) References Cited

U.S. PATENT DOCUMENTS

| | | | | |
|---|---|---|---|---|
| 5,877,923 A * | 3/1999 | Khan | ................... | G11B 5/4833 360/244.9 |
| 5,991,122 A * | 11/1999 | Tangren | ................ | G11B 5/4833 360/244.2 |
| 6,304,420 B1 * | 10/2001 | Murphy | ................ | G11B 5/4833 360/245.7 |
| 6,351,350 B1 * | 2/2002 | Symons | ................ | G11B 5/5582 360/244.9 |
| 6,377,424 B1 | 4/2002 | Yaeger | | |
| 6,417,991 B1 * | 7/2002 | Onda | .................... | G11B 5/4826 360/128 |
| 6,424,498 B1 | 7/2002 | Patterson et al. | | |
| 6,538,850 B1 | 3/2003 | Hadian et al. | | |
| 6,791,798 B1 * | 9/2004 | Mei | ....................... | G11B 5/4853 360/245.7 |
| 6,995,953 B2 | 2/2006 | Mahoney et al. | | |
| 7,430,096 B1 * | 9/2008 | Bjorstrom | ............ | G11B 5/4833 360/244.9 |
| 7,764,467 B2 * | 7/2010 | Hanya | .................. | G11B 5/4833 360/245.7 |
| 8,120,878 B1 * | 2/2012 | Drape | .................. | G11B 5/4833 360/244.9 |
| 8,149,545 B1 * | 4/2012 | Chai | .................... | G11B 5/4873 360/294.3 |
| 8,228,638 B1 * | 7/2012 | Wielenga | ............. | G11B 5/4833 360/244.9 |

(Continued)

*Primary Examiner* — Jefferson A Evans
(74) *Attorney, Agent, or Firm* — John D. Henkhaus (57) ABSTRACT

An approach to a head gimbal assembly (HAG), such as for a hard disk drive, includes a load beam formed with a deck portion and side rail portions extending from each lateral edge of the deck portion, where each side rail portion includes a crash stop structure extending away from and in the thickness direction of the side rail portion. In a configuration in which the side rails extend at an obtuse angle, z-shaped and reverse z-shaped crash stop structures, opposing angled c-shaped notch structures pairs, or opposing half dome shaped dimple pairs, on back-to-back load beams of a heat-assisted magnetic recording (HAMR) head gimbal assembly can elicit mechanical contact between the crash stops in the event of an operational shock event, thereby avoiding mechanical contact between HAMR chip-on-submount assembly (CoSA) laser modules.

22 Claims, 9 Drawing Sheets

(56) References Cited

U.S. PATENT DOCUMENTS

| | | | | |
|---|---|---|---|---|
| 8,699,186 B1* | 4/2014 | Hahn | ................... | G11B 5/4873 360/244.9 |
| 9,153,275 B1 | 10/2015 | Naniwa et al. | | |
| 2001/0030837 A1* | 10/2001 | Murphy | ............... | G11B 5/4813 360/244.9 |
| 2003/0002220 A1* | 1/2003 | Nojima | ................ | G11B 5/4833 360/244.9 |
| 2003/0086207 A1* | 5/2003 | Watadani | ................ | G11B 5/486 360/244.9 |
| 2006/0209465 A1* | 9/2006 | Takikawa | ............... | G11B 5/486 360/244.9 |
| 2013/0148231 A1 | 6/2013 | Huang et al. | | |

* cited by examiner

LOAD BEAM SIDE RAIL SHOCK CONTACT FEATURE

FIELD OF EMBODIMENTS

Embodiments of the invention may relate generally to a hard disk drive and particularly to an operational shock contact feature for a load beam side rail of a suspension assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a shock contact feature for a load beam side rail are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

As alluded to, increasing the storage capacity of hard disk drives (HDDs) is one of the on-going goals of HDD technology evolution. In one form, this goal manifests in increasing the areal density, such as through the use of heat-assisted magnetic recording (HAMR). With HAMR, a laser light source (e.g., a laser diode) needs to be integrated onto a magnetic recording head. Laser diodes are fragile and typically not suitable for direct mechanical attachment to the recording head slider. Therefore, a submount assembly may be used to mount the laser diode to the slider body.

Figure 1:
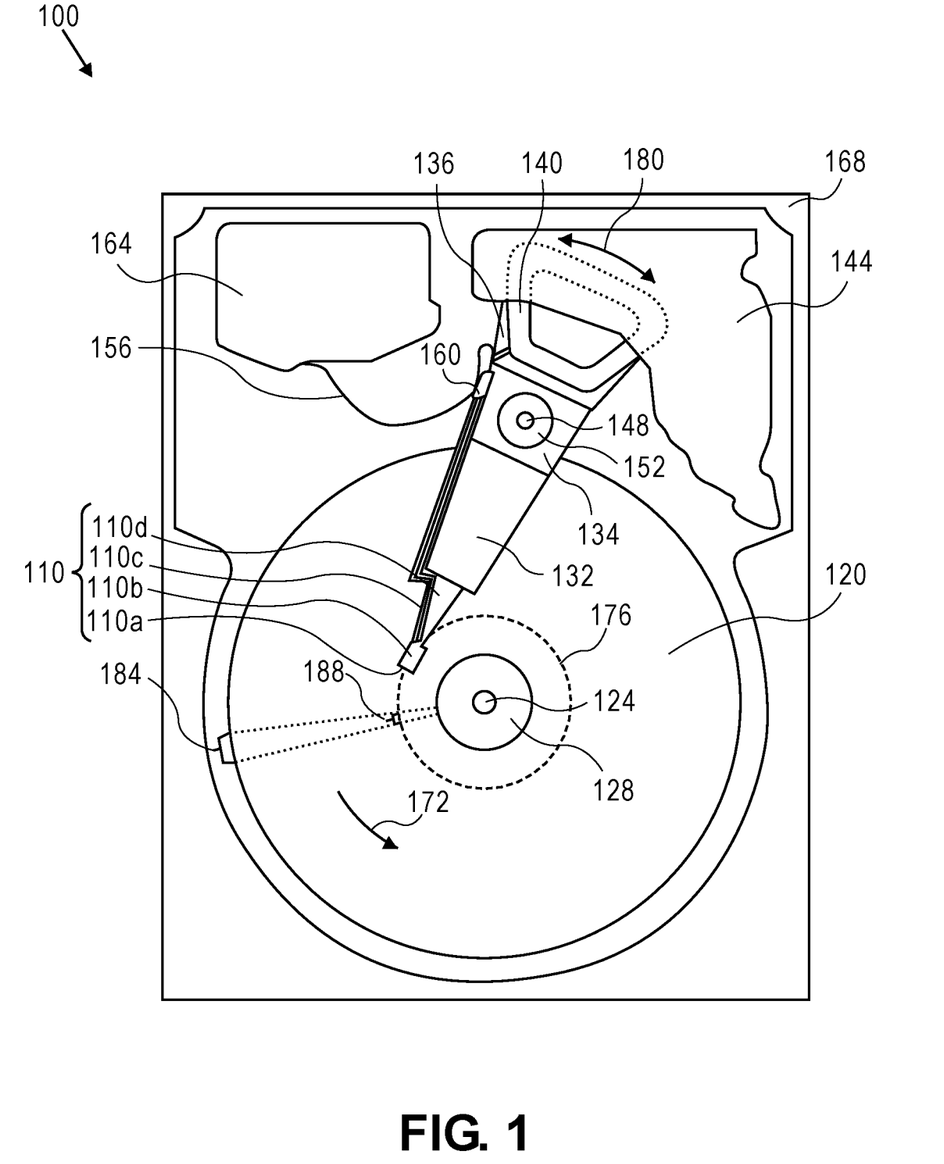
FIG. 1 is a plan view illustrating a hard disk drive, according to an embodiment.
Figure 2:
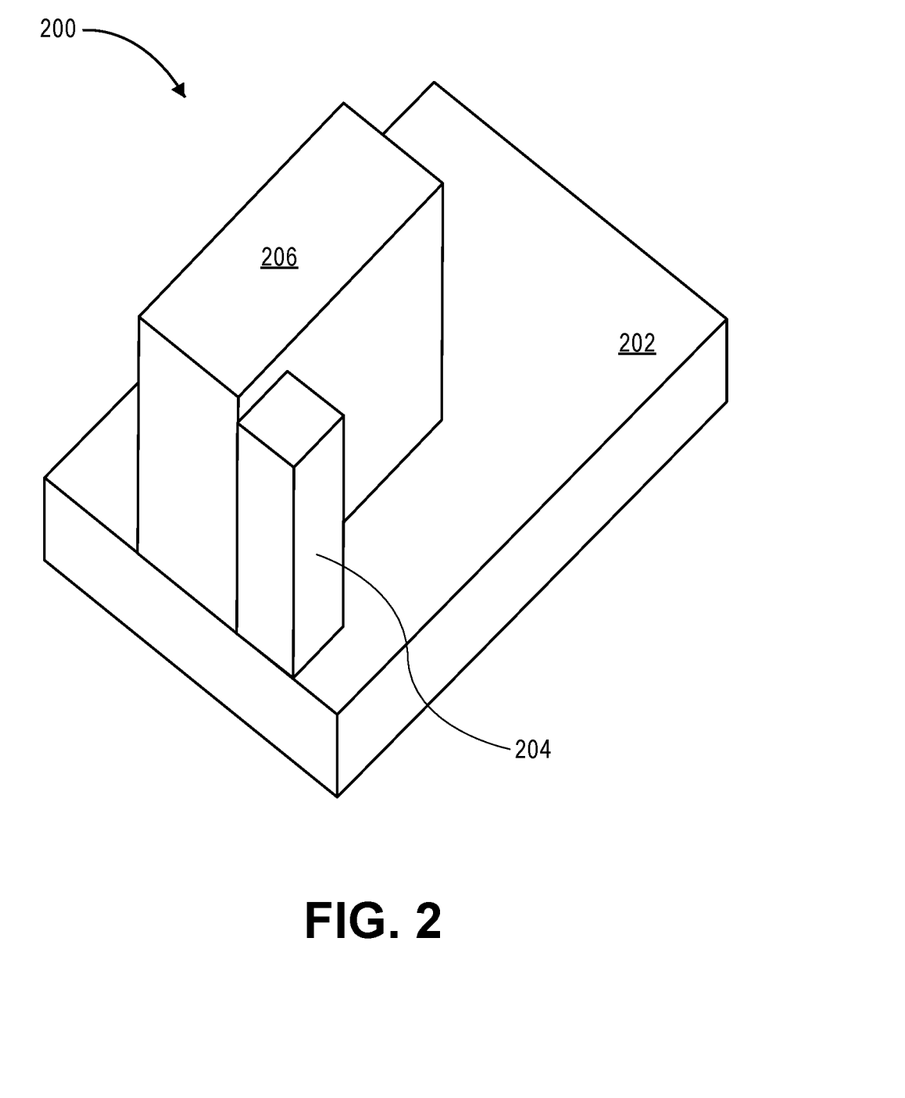
FIG. 2 is a perspective view illustrating a heat-assisted magnetic recording (HARM) head slider coupled with a laser module, according to an embodiment.

FIG. 2 is a perspective view illustrating a heat-assisted magnetic recording (HAMR) head slider coupled with a laser module, according to an embodiment. HAMR head slider assembly 200 comprises a laser light source 204 (or simply "laser 204"), such as a semiconductor laser or laser diode, coupled with or integrally-formed with a submount 206, for mounting to a HAMR head slider 202 and utilized for locally heating magnetic media 120 (FIG. 1). The component that is a combination of the laser 204 and the submount 206 is often collectively referred to as a "laser module" or a chip-on-submount assembly (CoSA) block or a CoSA laser module. A plasmonic heating device such as a near-field transducer (NFT) may be implemented for concentrating the optical energy from the laser 204 to a nanometer-sized spot to locally heat the magnetic media 120 in a region typically just upstream from a write pole. For a non-limiting example, a HAMR laser module comprising laser 204 and submount 206 may be mounted on or near the backside (e.g., the "flexure bonding" side opposite the air bearing surface, or ABS) of a HAMR head slider 202.

Further, a HAMR heating assembly may comprise a waveguide (not shown here) to guide, transmit or carry the optical energy from the laser 204 to the ABS to illuminate the NFT. This localized heating of the magnetic media 120 momentarily reduces the local coercivity of the magnetic media 120, which greatly facilitates writing to the media 120.

Figure 3A:
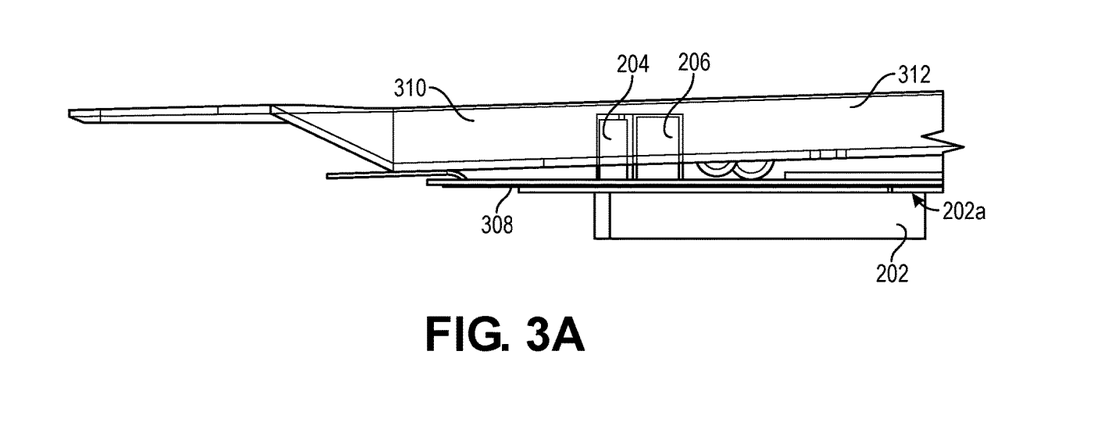
FIG. 3A is a side view illustrating a heat-assisted magnetic recording (HAMR) chip-on-submount assembly (CoSA), according to an embodiment.
Figure 3B:
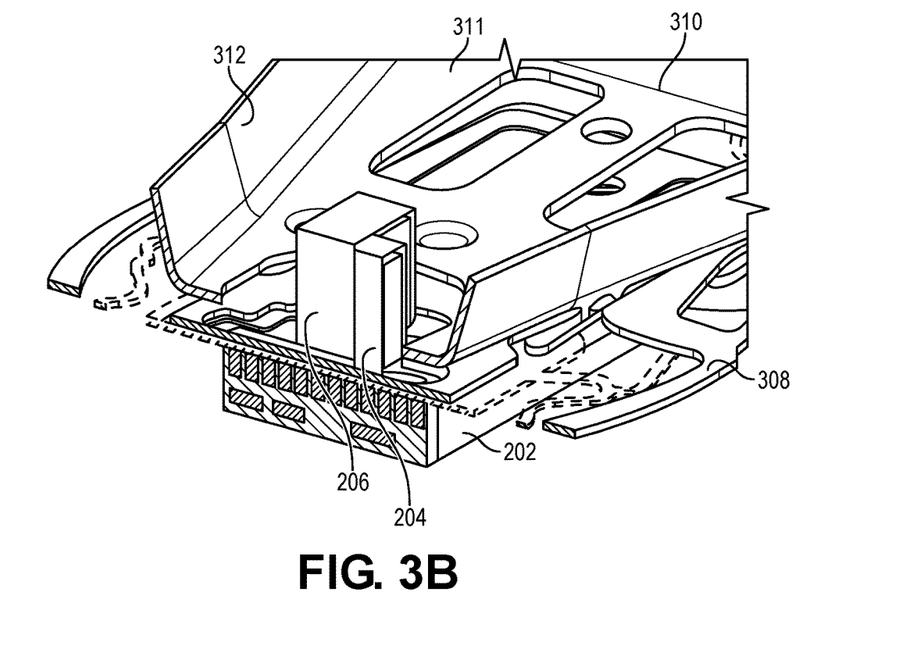
FIG. 3B is a cross-sectional perspective view illustrating the HAMR CoSA of FIG. 3A, according to an embodiment.

FIG. 3A is a side view illustrating a heat-assisted magnetic recording (HAMR) chip-on-submount assembly (CoSA), and FIG. 3B is a cross-sectional perspective view illustrating the HAMR CoSA of FIG. 3A, both according to an embodiment. For a HAMR design, the submount 206 is typically bonded to a flexure bonding surface 202a of the slider 202, whereby the emitting surface of the corresponding laser 204 faces the flexure bonding surface 202a of the slider 202. An orifice is typically formed in both the flexure 308 (depicted in part in phantom, for context, while allowing clarity to the load beam assemblies) and the load beam 310, and the laser module is passed through these orifices for coupling with the slider 202. A metal film may be deposited over the entire bonding surface of the submount 206 with the laser 204, whereby this metal film is electrically connected to one of the electrodes of the laser 204. The submount 206 may be electrically and mechanically connected to the flexure 308 via an electrically conductive solder junction, e.g., using a solder ball jet process as is known in the art. A longitudinal side rail 312 is typically fabricated on each lateral side of the load beam 310 by bending the sides of the load beam 310.

Historically, hard workable materials such as AlN have been used to create submounts for mechanical integration of laser diodes into subsystems. However, considering the alignment accuracy needs of HAMR, very smooth surfaces on the submount are desirable to reduce any positional inaccuracies due to surface roughness when joining the submount to the laser or to the slider body. In part to achieve this desired surface smoothness the submount 206 may be fabricated with a relatively brittle semiconductor material such as crystalline silicon, for a non-limiting example.

Figure 4A:
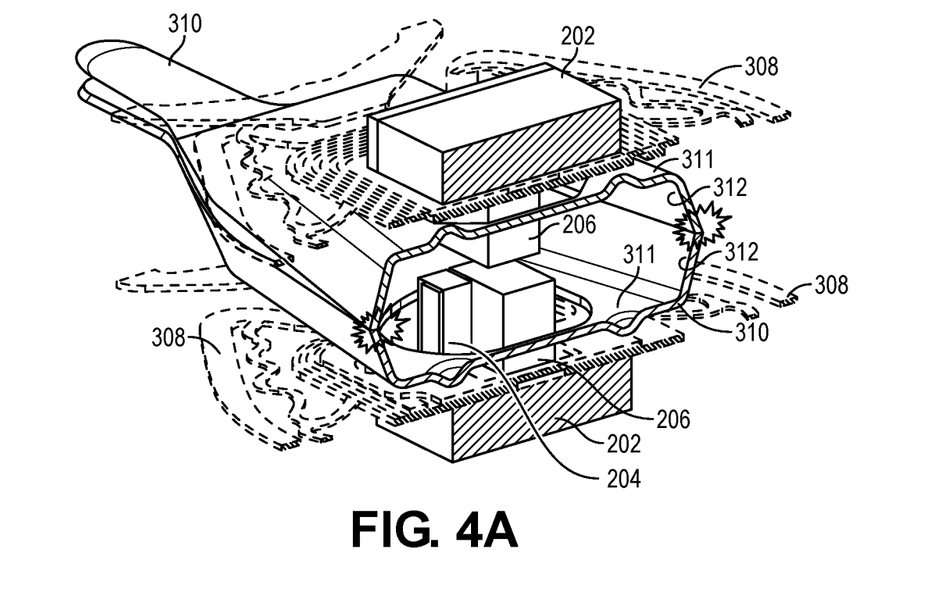
FIG. 4A is a cross-sectional perspective view illustrating optimally aligned back-to-back HARM CoSAs.
Figure 4B:
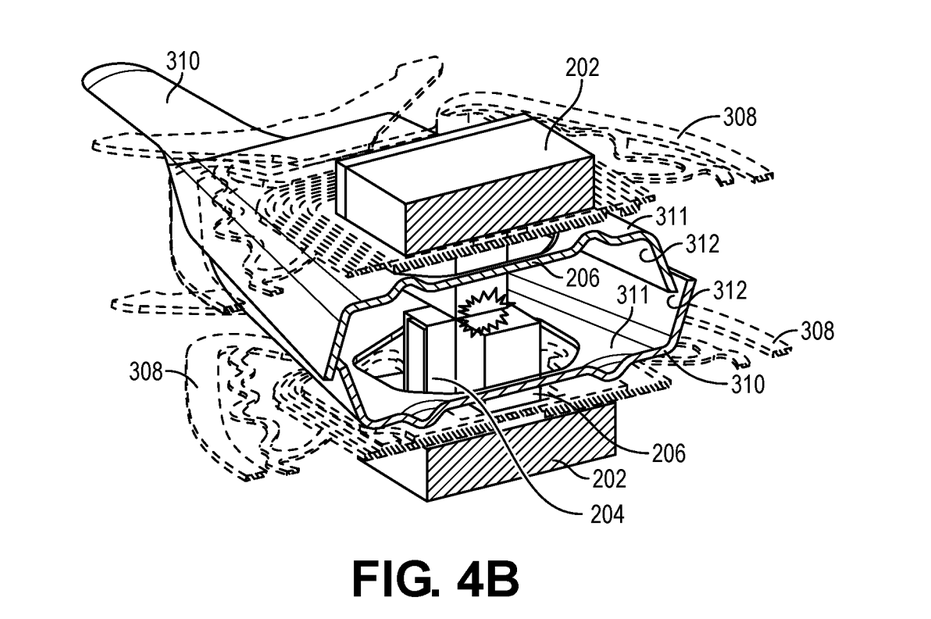
FIG. 4B is a cross-sectional perspective view illustrating misaligned back-to-back HAMR CoSAs.

FIG. 4A is a cross-sectional perspective view illustrating optimally aligned back-to-back HAMR CoSAs, and FIG. 4B is a cross-sectional perspective view illustrating misaligned back-to-back HAMR CoSAs. Each HAMR CoSA/load beam assembly is similar to that of FIGS. 3A, 3B and is depicted comprising a laser 204/submount 206 module coupled with a slider 202, and mounted on a flexure 308 (depicted in phantom, for context while allowing clarity to the load beam assemblies) gimbally coupled with a load beam 310. Here too the load beam 310 is shown to comprise the deck portion 311 and the side rail portions 312 extending therefrom.

Currently, as an example given for context, a HAMR CoSA laser module structure may protrude from the back side of the slider by 270-300 um, where the height of the side rails 312 of the load beam 310 are formed to the height of only 240 um. Considering the dimple height and material thickness stack up, the CoSA laser module may therefore be recessed from the top of the side rails 312 of the load beam 310 by 56 um. In the context of high disk count HDDs, in which the head gimbal assemblies (HGAs) are packed tightly back-to-back, even when the HGAs are on the load/unload ramp there is a significant risk that these CoSA laser modules could hit each other in response to an operational shock event or disturbance (see, e.g., the "crash" icon of FIG. 4B), thereby causing catastrophic functional damage (e.g., dislodged and chipped) to the CoSA laser modules. Hence, it is not considered prudent to rely on the existing load beam rail height to protect the CoSA blocks from hitting one another (see, e.g., the "crash" icons of FIG. 4A), because in view of just a slightest HGA-to-HGA misalignment or forming variation (see, e.g., FIG. 4B), these blade-thin side rail features (e.g., side rails 312) could be offset from one another and therefore could lose their ability to act as a pair of crash stop features to avoid the CoSA modules from undesirably contacting each other (reference is again made to the "crash" icon of FIG. 4B).

Load Beam Having Side Rail Shock Contact Feature

Figure 5A:
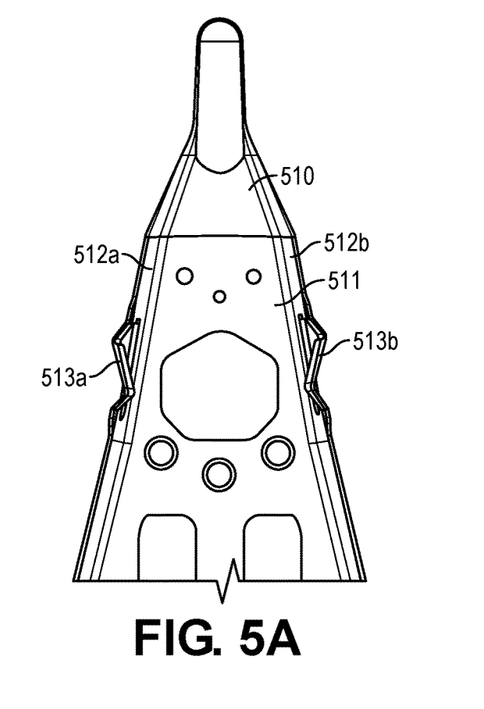
FIG. 5A is a plan view illustrating a load beam rail shock feature, according to an embodiment.
Figure 5B:
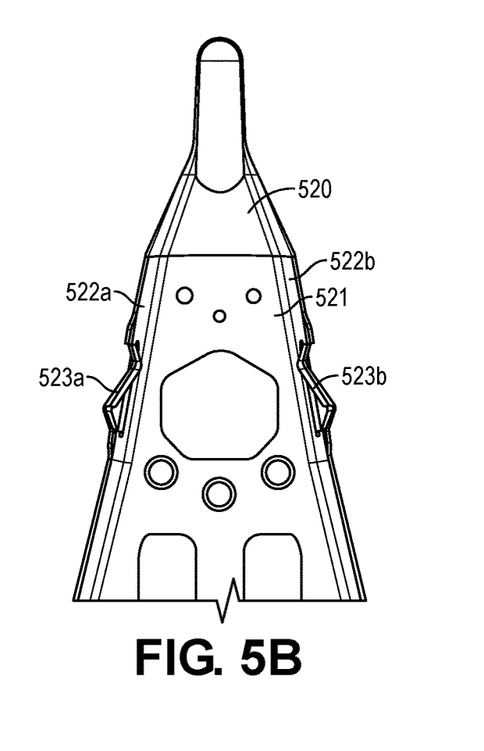
FIG. 5B is a plan view illustrating a load beam rail shock feature, according to an embodiment.

FIG. 5A is a plan view illustrating a load beam rail shock feature, and FIG. 5B is a plan view illustrating a load beam rail shock feature, according to embodiments. Generally, the side rail features depicted in FIG. 5A and the corollary side rail features depicted in FIG. 5B are preferably implemented in combination with one another in a back-to-back HGA/HSA configuration, e.g., in which both load beams are coupled with the same actuator arm, as part of a respective suspension assembly further comprising a flexure (see, e.g., flexure 308 of FIGS. 3A, 3B).

With reference first to FIG. 5A, a load beam 510 is shown comprising a (substantially) planar deck portion 511 (or simply "deck 511"), comprising an edge on each lateral side, and a (substantially) planar side rail portion 512a, 512b (or simply "side rail") extending away from each edge of the deck 511. According to an embodiment, each side rail 512a, 512b comprises a corresponding crash stop structure 513a, 513b (or simply "crash stop 513a", "crash stop 513b") extending away from and (substantially) normal to the plane of, or at least out-of-plane with (e.g., in the thickness direction of the side rail), its corresponding side rail 512a, 512b. According to an embodiment, and as depicted, each side rail 512a, 512b extends from the deck 511 at an obtuse angle, whereby the configuration of this structural feature is noteworthy in that such a configuration results in at least a portion of each "out of plane" (relative to the corresponding side rail) crash stop 513a, 513b extending higher in the z-direction (e.g., normal to the deck portion 511) than the corresponding side rail 512a, 512b itself.

Similarly, with reference first to FIG. 5B, a load beam 520 is shown comprising a (substantially) planar deck portion 521 (or simply "deck 521"), comprising an edge on each lateral side, and a (substantially) planar side rail portion 522a, 522b (or simply "side rail") extending away from each edge of the deck 521. According to an embodiment, each side rail 522a, 522b comprises a corresponding crash stop structure 523a, 523b (or simply "crash stop 523a", "crash stop 523b") extending away from and (substantially) normal to the plane of, or at least out-of-plane with (e.g., in the thickness direction of the side rail), its corresponding side rail 522a, 522b. According to an embodiment, and as depicted, each side rail 522a, 522b extends from the deck 521 at an obtuse angle, whereby the configuration of this structural feature is noteworthy in that such a configuration results in at least a portion of each "out of plane" (relative to the corresponding side rail) crash stop 523a, 523b extending higher in a z-direction (e.g., normal to the deck portion 521) than the corresponding side rail 522a, 522b itself.

According to an embodiment and as depicted in FIG. 5A, each crash stop 513a, 513b is a z-shaped structure that extends away from the plane of the corresponding side rail 512a, 512b in one direction at one or a first end and extends away from the plane of the corresponding side rail in an opposing direction at the other or second end, i.e., what is referred to herein as a "z-shaped" structure is formed. Similarly or as a corollary, according to an embodiment and as depicted in FIG. 5B, each crash stop 523a, 523b is a z-shaped structure that extends away from the plane of the corresponding side rail 522a, 522b in one direction at one or a first end and extends away from the plane of the corresponding side rail in an opposing direction at the other or second end, i.e., what is referred to herein as a "reverse z-shaped" structure is formed, where the first end of the first load beam corresponds to the second end of the second load beam and the second end of the first load beam corresponds to the first end of the second load beam.

Thus, the pair of crash stops 513a, 513b of the load beam 510 and the pair of crash stops 523a, 523b of the load beam 520 are not a mirrored structure of one another, rather the pair of crash stops of each respective mating load beam 510, 520 (when assembled back-to-back, e.g., as the UP and DN facing load beams of a head gimbal assembly (HGA) and/or a head stack assembly (HSA)) are generally a reverse of one another. Here, the "UP" suspension or load beam refers to the lower load beam that interacts with the top or "up" surface of a corresponding disk and the "DN" suspension or load beam refers to the upper load beam that interacts with the bottom or "down" surface of a corresponding disk. As such, each pair of mating crash stops 513a, 523a and mating crash stops 513b, 523b are able to function as a crash contact stopper pair. Each crash stop feature could be coined/formed at a flat load beam state prior to the side rail forming, to provide load beam side rail land features in the side rails' thickness direction.

Figure 6A:
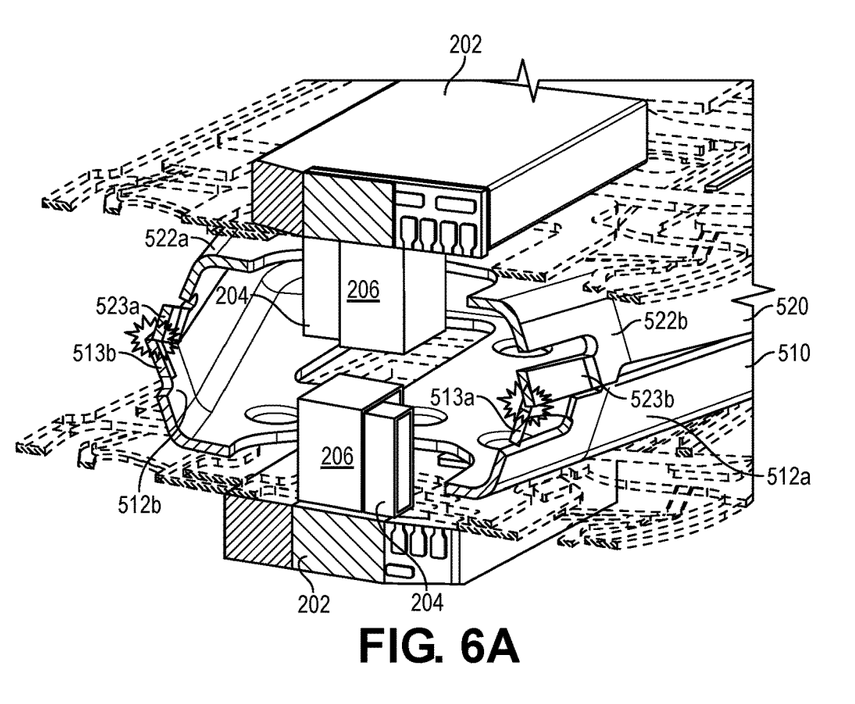
FIG. 6A is a cross-sectional perspective view illustrating back-to-back HAMR CoSAs assembled with a suspension having a load beam rail shock feature, according to an embodiment.
Figure 6B:
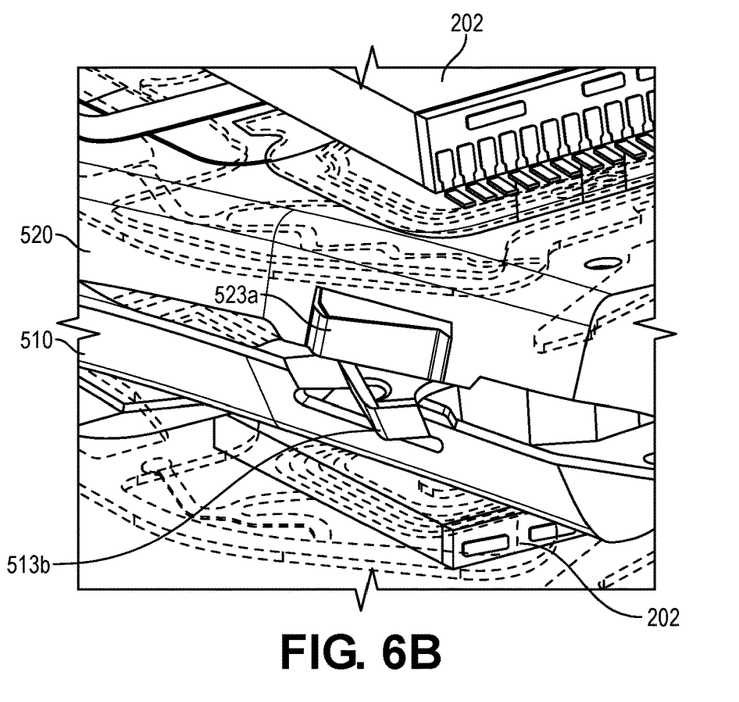
FIG. 6B is a cross-sectional perspective view illustrating back-to-back load beams having the rail shock feature of FIG. 6A, according to an embodiment.
Figure 6C:
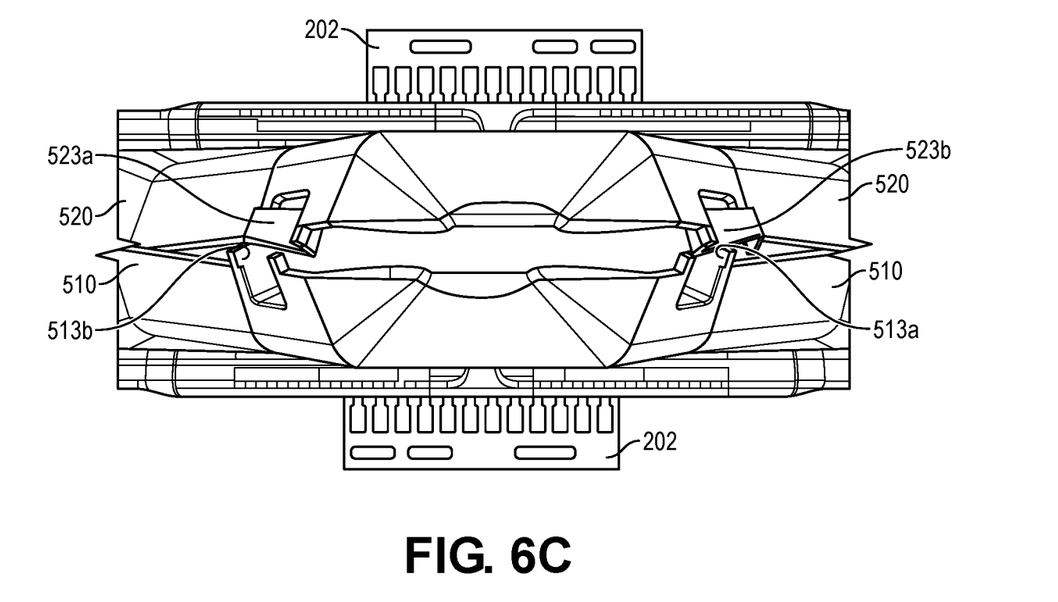
FIG. 6C is a cross-sectional front view illustrating the back-to-back load beams having the rail shock feature of FIG. 6A, according to an embodiment.

FIG. 6A is a cross-sectional perspective view illustrating back-to-back HAMR CoSAs assembled with a suspension having a load beam rail shock feature, and FIG. 6B is a cross-sectional perspective view illustrating back-to-back load beams having the rail shock feature of FIG. 6A, and FIG. 6C is a cross-sectional front view illustrating the back-to-back load beams having the rail shock feature of FIG. 6A, all according to an embodiment. Collectively, FIGS. 6A-6C depict the functional operation of a back-to-back HGA/HSA assembly, in which the crash stop features of the side rails of the load beams serve to ensure that the back-to-back CoSAs are prohibited or inhibited from mechanical contact, i.e., crashing together, in the event of an operational shock event. Note that the flexures (e.g., flexures 308 of FIGS. 3A, 3B) are illustrated in phantom, to provide context while allowing for clarity of the underlying load beam assemblies.

Each HAMR CoSA/load beam assembly is depicted comprising a laser 204/submount 206 module coupled with a slider 202, and mounted on a flexure 308 (depicted in phantom) gimbally coupled with a respective load beam 510, 520 (see FIGS. 5A, 5B). Here too each load beam 510, 520 comprises the respective deck 511, 521 and the corresponding side rails 512a, 512b, 522a, 522b extending therefrom. Further, as also illustrated in FIGS. 5A, 5B, each side rail comprises a crash stop feature. That is, side rails 512a, 512b comprise a respective crash stop 513a, 513b, and side rails 522a, 522b comprise a respective crash stop 523a, 523b. The respective pairs of side rails are depicted in an operationally functional state, i.e., serving as crash stops to prohibit or inhibit the crashing together of the CoSA assemblies (see, e.g., the "crash" icons of FIG. 6A).

As illustrated throughout FIGS. 6A-6C but with specific reference here to FIG. 6C, the load beams 510, 520 are depicted in a misaligned state, whereby but for the presence of the crash stops 513a, 513b, 523a, 523b, the CoSA laser modules are subject to crashing together in the event of an operational shock (see, e.g., FIG. 4B). These figures illustrate that a first HAMR CoSA, comprising a first laser 204 mounted on a first submount 206, extends through an orifice in the deck portion 511 (FIG. 5A) of a first load beam 510 and, further, a first slider 202 housing a first read-write transducer is coupled with the CoSA laser module and is mounted on a side of the first load beam 510 (e.g., on a flexure such as flexure 308 of FIGS. 3A-4B) that opposes the side rail portions 512a, 512b of the load beam 510. In the context of a head gimbal assembly (HGA) and/or a head stack assembly (HSA), a second HAMR CoSA, comprising a second laser 204 mounted on a second submount 206, extends through an orifice in the deck portion 521 (FIG. 5B) of a second load beam 520 and, further, a second slider 202 housing a second read-write transducer is coupled with the CoSA laser module and is mounted on a side of the second load beam 520 (e.g., on a flexure such as flexure 308 of FIGS. 3A-4B) that opposes the side rail portions 522a, 522b of the load beam 520. In such a configuration, the crash stops 513a, 513b of the side rails 512a, 512b of the first load beam 510 of a first suspension and the crash stops 523a, 523b of the side rails 522a, 522b of the second load beam 520 of a second suspension are inter-relatedly configured such mechanical contact is elicited or promoted between the crash stops 513a, 513b of the first load beam 510 and the crash stops 523a, 523b of the second load beam 520 responsive to an operational shock event. Consequently, the respective pairs of side rails 512a-512b, 522a-522b, by way of their crash stops 513a-513b, 523a-523b, inhibit or effectively prohibit the crashing together of the CoSA assemblies (see, e.g., the "crash" icons of FIG. 6A).

Figure 7A:
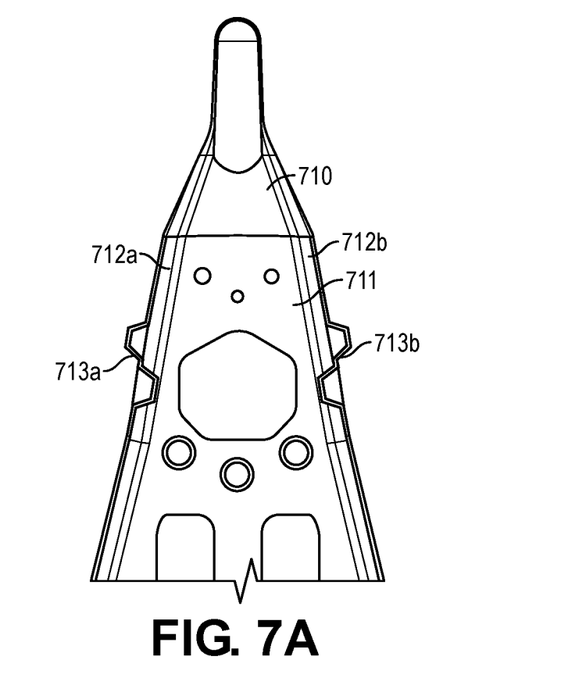
FIG. 7A is a plan view illustrating an example load beam rail shock forming shape or feature, according to an embodiment.
Figure 7B:
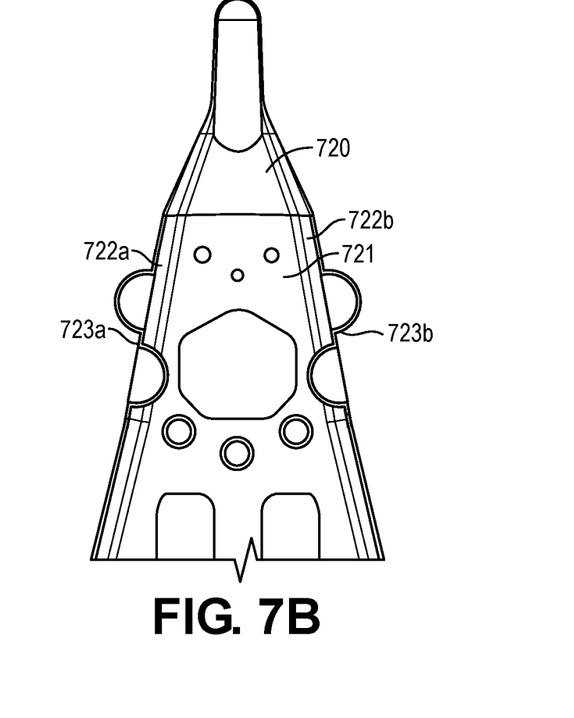
FIG. 7B is a plan view illustrating an example load beam rail shock forming shape or feature, according to an embodiment.

FIG. 7A is a plan view illustrating an example load beam rail shock forming shape or feature, according to an embodiment, and FIG. 7B is a plan view illustrating another example load beam rail shock forming shape or feature, according to an embodiment. With reference first to FIG. 7A, as an alternative structural configuration for one or more of the crash stops described elsewhere herein as z-shaped structures (e.g., crash stops 513a, 513b, 523a, 523b of FIGS. 6A-6C), according to an embodiment, each side rail portion 712a, 712b of a (first) load beam 710 is again formed to extend away from each edge of the deck portion 711 at an obtuse angle, where a corresponding crash stop structure 713a, 713b comprises an angled c-shaped notch structure pair. That is, one side rail notch structure of the pair 713a (and 713b) angles inward and one adjacent side rail notch structure of the pair 713a (and 713b) angles outward, and each notch structure extends away from the plane of the corresponding side rail portion 712a, 712b. Similarly, in the context of an assembled head gimbal assembly (HGA) and/or head stack assembly (HSA), a back-to-back (second) load beam such as load beam 710 may also comprise each side rail portion 712a, 712b formed to extend away from each edge of the deck portion 711 at an obtuse angle with the corresponding crash stop structure(s) 713a, 713b being an angled c-shaped notch structure pair that extends away from the plane of the corresponding side rail portion 712a, 712b. When assembled back-to-back (e.g., as the UP and DN facing load beams of a head gimbal assembly (HGA) and/or a head stack assembly (HSA)), such load beams are generally a reverse of one another. For example, the pair of crash stops 713a, 713b of the load beam 710 and a pair of opposing crash stops of an adjacent/mating load beam are not mirrored structures relative to one another, rather the pair of crash stops of each respective load beam are reversed structures, i.e., to ensure a material cross path to promote contact during a shock event. Hence, each respective so-configured side rail 712a, 712b, by way of the corresponding crash stop 713a, 713b, is configured to inhibit or effectively prohibit the crashing together of the CoSA assemblies (see, e.g., the "crash" icons of FIG. 6A).

With reference next to FIG. 7B, as an alternative structural configuration for one or more of the crash stops described elsewhere herein as z-shaped structures (e.g., crash stops 513a, 513b, 523a, 523b of FIGS. 6A-6C), according to an embodiment, each side rail portion 722a, 722b of a (first) load beam 720 is again formed to extend away from each edge of the deck portion 721 at an obtuse angle, where a corresponding crash stop structure 723a, 723b comprises a half dome dimple shaped structure pair. That is, one side rail dimple structure of the pair 723a (and 723b) angles inward and one adjacent side rail dimple structure of the pair 723a (and 723b) angles outward, and each dimple structure extends away from the plane of the corresponding side rail portion 722a, 722b. Similarly, in the context of an assembled head gimbal assembly (HGA) and/or head stack assembly (HSA), a back-to-back (second) load beam such as load beam 720 may also comprise each side rail portion 722a, 722b formed to extend away from each edge of the deck portion 721 at an obtuse angle with the corresponding crash stop structure(s) 723a, 723b being half dome dimple structure pair that extends away from the plane of the corresponding side rail portion 722a, 722b. When assembled back-to-back (e.g., as the UP and DN facing load beams of a head gimbal assembly (HGA) and/or a head stack assembly (HSA)), such load beams are generally a reverse of one another. For example, the pair of crash stops 723a, 723b of the load beam 720 and a pair of opposing crash stops of an adjacent/mating load beam are not mirrored structures relative to one another, rather the pair of crash stops of each respective load beam are reversed structures, i.e., to ensure a material cross path to promote contact during a shock event. Hence, each respective so-configured side rail 722a, 722b, by way of the corresponding crash stop 723a, 723b, is configured to inhibit or effectively prohibit the crashing together of the CoSA assemblies (see, e.g., the "crash" icons of FIG. 6A).

Method of Assembling a Head Gimbal Assembly

Figure 8:
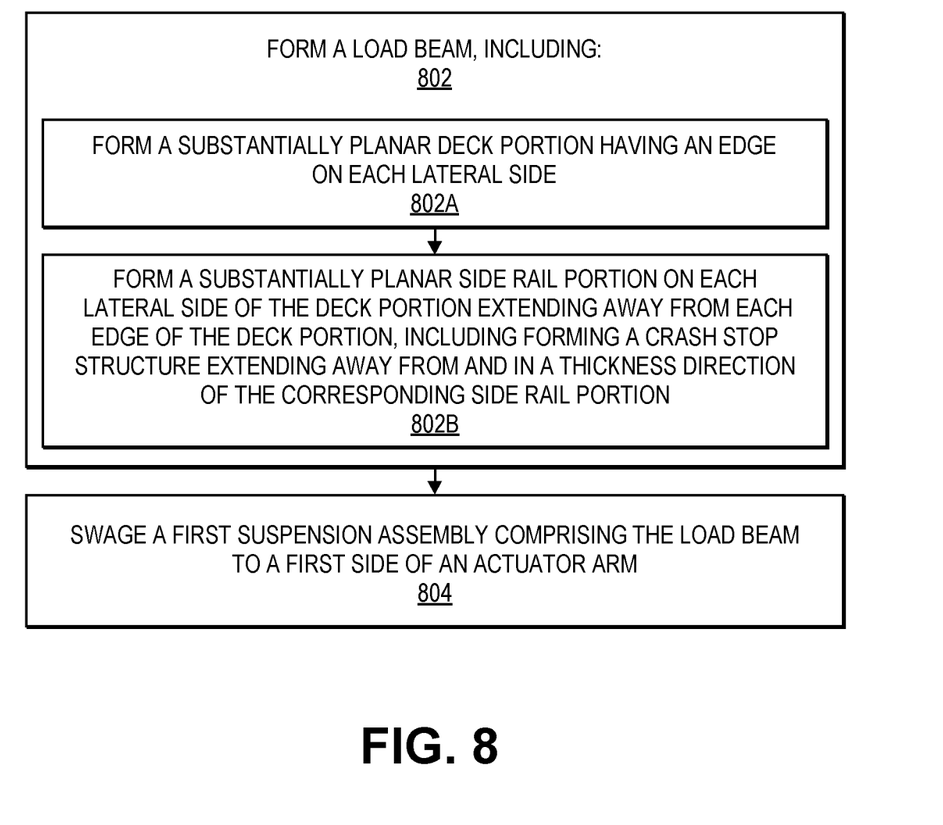
FIG. 8 is a flow diagram illustrating a method of assembling a head gimbal assembly, according to an embodiment.

FIG. 8 is a flow diagram illustrating a method of assembling a head gimbal assembly, according to an embodiment.

At block 802, a load beam is formed. For example, load beam 510 (FIG. 5A) and/or load beam 520 (FIG. 5B) and/or load beam 710, 720 (FIGS. 7A, 7B) is formed. Forming a load beam at block 802 includes, at block 802a, forming a substantially planar deck portion having an edge on each lateral side. For example, deck 511 (FIG. 5A) and/or deck 521 (FIG. 5B) and/or deck 711, 721 (FIGS. 7A, 7B) is formed. Further, at block 802b, a substantially planar side rail portion is formed on each lateral side of the deck portion extending away from each edge of the deck portion, including forming a crash stop structure extending away from and in a thickness direction of the corresponding side rail portion. For example, side rail portion 512a, 512b (and/or side rail portion 522a, 522b of FIG. 5B; 712a, 712b, 722a, 722b of FIGS. 7A, 7B) is formed on each lateral side of the deck portion 511 (and/or deck 521 of FIG. 5B; and/or deck 711, 721 of FIGS. 7A, 7B) extending away from each edge of the deck portion 511, 521, 711, 721 including forming a crash stop 513a, 513b (and/or crash stops 523a, 523b of FIG. 5B; and/or crash stop 713a, 713b, 723a, 723b of FIGS. 7A, 7B) extending away from and in a thickness direction of the corresponding side rail portion 512a, 512b, 522a, 522b, 712, 722.

At block 804, a first suspension assembly comprising the load beam, formed at block 802, is swaged to a first side of an actuator arm. For example, a first suspension assembly (see, e.g., FIG. 3A) comprising the load beam 510, 520, 710, 720 is swaged to an actuator arm (see, e.g., arm 132 of FIG. 1). Swaging is a well-known forging process typically enacted by forcing a swage ball through the through-hole to deform or alter the dimensions of a swage boss (e.g., rotary swaging), to cold work the metals to form a bond or inter-coupling of a swage plate/suspension subcomponent with an arm subcomponent.

Thus, in view of the embodiments described herein, further height reduction of CoSA units is avoided as the crash stop feature(s) help to eliminate CoSA-to-CoSA contact under shock. Further, embodiments allow for HGA to HGA misalignment. Still further, these crash stop features could be formed similar to other sheet metal forming features, with relatively minimal cost.

Physical Description of an Illustrative Operating Context

Embodiments may be used in the context of a suspension load beam for a hard disk drive (HDD). Thus, in accordance with an embodiment, a plan view illustrating a conventional HDD 100 is shown in FIG. 1 to aid in describing how a conventional HDD typically functions.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM, or "voice coil actuator") that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted by a flexible cable assembly (FCA) 156 (or "flex cable"), also at times referred to as a flexible printed circuit (FPC). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head gimbal assembly (HGA) comprising:
a suspension assembly comprising:
a load beam, and
a flexure;
wherein the load beam comprises:
a deck portion comprising an edge on each lateral side, and
a substantially planar side rail portion extending away from each edge of the deck portion, wherein:
each side rail portion comprises a crash stop structure extending away from and substantially normal to the plane of the corresponding side rail portion; and
each crash stop structure extends away from the plane of the corresponding side rail portion in one direction at a first end and extends away from the plane of the corresponding side rail portion in an opposing direction at a second end.

2. The HGA of claim 1, wherein:
the side rail portion extends away from each edge of the deck portion at an obtuse angle.

3. The HGA of claim 1, wherein the suspension assembly is a first suspension assembly comprising a first load beam coupled with one side of an actuator arm, the HGA further comprising:
a second suspension assembly comprising a second load beam and a second flexure coupled with an opposing side of the actuator arm; and
wherein the second load beam comprises:
a deck portion comprising an edge on each lateral side,
a substantially planar side rail portion extending away from each edge of the deck portion at an obtuse angle, wherein each side rail portion comprises a crash stop structure extending away from and substantially normal to the plane of the corresponding side rail portion in the one direction at a first end and extending away from the plane of the corresponding side rail portion in the opposing direction at a second end, and
wherein the first end of the first load beam corresponds to the second end of the second load beam and the second end of the first load beam corresponds to the first end of the second load beam.

4. The HGA of claim 3, further comprising:
a first heat-assisted magnetic recording (HAMR) chip-on-submount assembly (CoSA) extending through an orifice in the deck portion of the first load beam and comprising a first laser mounted on a first submount;
a first head slider coupled with the first CoSA and mounted on a side of the first load beam opposing the side rail portions and housing a first read-write transducer;
a second heat-assisted magnetic recording (HAMR) chip-on-submount assembly (CoSA) extending through an orifice in the deck portion of the second load beam and comprising a second laser mounted on a second submount; and
a second head slider coupled with the first CoSA and mounted on a side of the second load beam opposing the side rail portions and housing a second read-write transducer.

5. The HGA of claim 4, wherein the crash stop structures of the side rail portions of the first load beam of the first suspension and the crash stop structures of the side rail portions of the second load beam of the second suspension are inter-relatedly configured such that the crash stop structures of the first load beam mechanically contact with the crash stop structures of the second load beam responsive to an operational shock event.

6. The HGA of claim 1, wherein:
the side rail portion extends away from each edge of the deck portion at an obtuse angle; and
each crash stop structure is a z-shaped structure that extends away from the plane of the corresponding side rail portion in one direction at a first end and extends away from the plane of the corresponding side rail portion in an opposing direction at a second end.

7. The HGA of claim 1, wherein:
the side rail portion extends away from each edge of the deck portion at an obtuse angle; and
each crash stop structure is an angled c-shaped notch structure pair comprising notch structures that extend away in opposing directions from the plane of the corresponding side rail portion.

8. The HGA of claim 7, wherein the suspension assembly is a first suspension assembly comprising a first load beam coupled with one side of an actuator arm, the HGA further comprising:
a second suspension assembly comprising a second load beam coupled with an opposing side of the actuator arm; and
wherein the second load beam comprises:
a deck portion comprising an edge on each lateral side,
a substantially planar side rail portion extending away from each edge of the deck portion at an obtuse angle, wherein each side rail portion comprises an angled c-shaped notch structure pair comprising notch structures extending away in opposing directions from the plane of the corresponding side rail portion.

9. The HGA of claim 1, wherein:
the side rail portion extends away from each edge of the deck portion at an obtuse angle; and
each crash stop structure is half dome shaped dimple pair comprising dimples that extend away in opposing directions from the plane of the corresponding side rail portion.

10. The HGA of claim 1, further comprising:
a heat-assisted magnetic recording (HAMR) chip-on-submount assembly (CoSA) extending through an orifice in the deck portion of the load beam and comprising a laser mounted on a submount; and
a head slider coupled with the CoSA and mounted on a side of the load beam opposing the side rail portions and housing a first read-write transducer.

11. A hard disk drive comprising the HGA of claim 1.

12. A hard disk drive (HDD) comprising:
a plurality of recording disk media rotatably mounted on a spindle;
a first head slider housing a first read-write transducer configured to read from and to write to a first recording disk medium of the plurality of recording disk media;
a voice coil actuator configured to move the first head slider to access portions of the first recording disk medium; and
a head stack assembly (HSA) coupled with the voice coil actuator, the HSA comprising:
a suspension assembly comprising:
a load beam, and
a flexure,
wherein the load beam comprises:
a deck comprising an edge on each lateral side, and
a substantially planar side rail extending away from each edge of the deck and comprising a crash stop structure extending away from and substantially normal to the plane of the corresponding side rail, and
wherein each crash stop structure extends away from the plane of the corresponding side rail portion in one direction at a first end and extends away from the plane of the corresponding side rail portion in an opposing direction at a second end.

13. The HDD of claim 12, wherein:
the side rail extends away from each edge of the deck at an obtuse angle.

14. The HDD of claim 12, wherein the suspension assembly is a first suspension assembly comprising a first load beam coupled with one side of an arm, and wherein the HSA further comprises:
a second suspension assembly comprising a second load beam and a second flexure coupled with an opposing side of the arm; and
wherein the second load beam comprises:
a deck comprising an edge on each lateral side,
a substantially planar side rail extending away from each edge of the deck at an obtuse angle, wherein each side rail comprises a crash stop structure extending away from and substantially normal to the plane of the corresponding side rail in the one direction at a first end and extending away from the plane of the corresponding side rail in the opposing direction at a second end, and
wherein the first end of the first load beam corresponds to the second end of the second load beam and the second end of the first load beam corresponds to the first end of the second load beam.

15. The HDD of claim 14, further comprising:
a first heat-assisted magnetic recording (HAMR) chip-on-submount assembly (CoSA) extending through an orifice in the deck of the first load beam and comprising a first light source mounted on a first submount;
a first head slider coupled with the first CoSA and mounted on a side of the first load beam opposing the side rails and housing a first read-write transducer;
a second heat-assisted magnetic recording (HAMR) chip-on-submount assembly (CoSA) extending through an orifice in the deck of the second load beam and comprising a second light source mounted on a second submount; and
a second head slider coupled with the first CoSA and mounted on a side of the second load beam opposing the side rails and housing a second read-write transducer.

16. The HDD of claim 15, wherein the crash stop structures of the side rails of the first load beam of the first suspension and the crash stop structures of the side rails of the second load beam of the second suspension are interrelatedly configured such that the crash stop structures of the first load beam mechanically contact with the crash stop structures of the second load beam responsive to an operational shock event.

17. The HDD of claim 12, wherein:
the side rail extends away from each edge of the deck portion at an obtuse angle; and
each crash stop structure is from a group consisting of a z-shaped structure extending away in opposing directions from the plane of the corresponding side rail, an angled c-shaped notch structure pair comprising notch structures extending away in opposing directions from the plane of the corresponding side rail, and a half dome shaped dimple pair comprising dimples extending away in opposing directions from the plane of the corresponding side rail.

18. The HDD of claim 12, further comprising:
a heat-assisted magnetic recording (HAMR) chip-on-submount assembly (CoSA) extending through an orifice in the deck of the load beam and comprising a light source mounted on a submount; and
a head slider coupled with the CoSA and mounted on a side of the load beam opposing the side rails and housing a first read-write transducer.

19. A method of assembling a head gimbal assembly (HGA),
the method comprising:
forming a load beam by:
    forming a deck portion having an edge on each lateral side, and
    forming a substantially planar side rail portion on each lateral side of the deck portion extending away from each edge of the deck portion, including:
        forming a crash stop structure extending away from and in a thickness direction of the corresponding side rail portion and from a group consisting of a z-shaped structure that extends away from a plane of the corresponding side rail portion in one direction at a first end and extends away from the plane of the corresponding side rail portion in an opposing direction at a second end, an angled c-shaped notch structure pair comprising notch structures that extend away in opposing directions from the plane of the corresponding side rail portion, and a half dome shaped dimple pair comprising dimples that extend away in opposing directions from the plane of the corresponding side rail portion; and
swaging a first suspension assembly comprising the load beam to a first side of an actuator arm.

20. The method of claim 19, wherein forming each side rail portion comprises forming the side rail portion to extend away from each edge of the deck portion at an obtuse angle.

21. The method of claim 19, further comprising:
coupling a heat-assisted magnetic recording (HAMR) chip-on-submount assembly (CoSA), comprising a laser light source mounted on a submount, with a head slider; and
mounting the head slider on a side of the load beam opposing the side rail portions, such that the CoSA extends through an orifice in the deck portion of the load beam to the side of the load beam from which the side rail portions extend.

22. A head gimbal assembly (HGA) comprising:
a suspension assembly comprising:
    a load beam, and
    a flexure;
wherein the load beam comprises:
    a deck portion comprising an edge on each lateral side, and
    a substantially planar side rail portion extending away from each edge of the deck portion at an obtuse angle;
wherein:
    each side rail portion comprises a crash stop structure extending away from and substantially normal to the plane of the corresponding side rail portion; and
    each crash stop structure is from a group consisting of:
        (i) a z-shaped structure that extends away from the plane of the corresponding side rail portion in one direction at a first end and extends away from the plane of the corresponding side rail portion in an opposing direction at a second end,
        (ii) an angled c-shaped notch structure pair comprising notch structures that extend away in opposing directions from the plane of the corresponding side rail portion, and
        (iii) a half dome shaped dimple pair comprising dimples that extend away in opposing directions from the plane of the corresponding side rail portion.

* * * * *